United States Patent [19]
Carr et al.

[11] Patent Number: 5,751,802
[45] Date of Patent: May 12, 1998

[54] TELECOMMUNICATIONS SERVICE PROVISIONING

[76] Inventors: Richard Gregory Carr, 38 W. 810 Deer Run Dr., St Charles, Ill. 60175; Francis Joseph Pope, III, 2509 Braddock Dr., Naperville, Ill. 60565

[21] Appl. No.: 794,129

[22] Filed: Feb. 3, 1997

Related U.S. Application Data

[63] Continuation of Ser. No. 627,326, Apr. 4, 1996, abandoned, which is a continuation of Ser. No. 364,650, Dec. 27, 1994, abandoned.

[51] Int. Cl.$^6$ .................................................. H04M 3/42
[52] U.S. Cl. .............................. 379/201; 379/67; 379/93
[58] Field of Search .............................. 379/201, 211, 379/212, 230, 221, 102, 114, 167, 207, 67, 93

[56] References Cited

U.S. PATENT DOCUMENTS

| | | | |
|---|---|---|---|
| 4,845,739 | 7/1989 | Katz | 379/92 |
| 5,012,511 | 4/1991 | Hanle et al. | 379/211 |
| 5,086,461 | 2/1992 | Thorn et al. | 379/230 |
| 5,095,505 | 3/1992 | Finucane et al. | 379/201 |
| 5,222,120 | 6/1993 | McLeod et al. | 379/201 |
| 5,222,125 | 6/1993 | Creswell et al. | 379/114 |
| 5,288,976 | 2/1994 | Citron et al. | 379/102 |
| 5,311,583 | 5/1994 | Friedes et al. | 379/201 |
| 5,329,578 | 7/1994 | Brennan et al. | 379/201 |
| 5,345,501 | 9/1994 | Shelton | 379/201 |
| 5,377,186 | 12/1994 | Wegner et al. | 379/201 |
| 5,392,342 | 2/1995 | Rosenthal | 379/201 |
| 5,394,463 | 2/1995 | Fischell et al. | 379/201 |
| 5,416,833 | 5/1995 | Harper et al. | 379/201 |
| 5,422,940 | 6/1995 | Endo et al. | 379/201 |
| 5,430,791 | 7/1995 | Feit et al. | 379/201 |
| 5,475,746 | 12/1995 | Miller et al. | 379/207 |
| 5,479,495 | 12/1995 | Blumhardt | 379/207 |
| 5,509,060 | 4/1996 | Hall et al. | 379/201 |
| 5,541,983 | 7/1996 | Rose | 379/211 |
| 5,544,236 | 8/1996 | Andruska et al. | 379/201 |

OTHER PUBLICATIONS

AT&T Technical Document 235–190–101, Business And Modular Features, Issue 2.00, Sep. 1990, Sections 2–4.
AT&T Technical Document 235–190–105, ISDN Feature Descriptions, Issue 3.02, Dec. 1991, Sections 2–4.
R. F. Rey, Editor, "Engineering And Operations In The Bell System", 2nd Edition, Reorganized and Rewritten Telecommunications In The Bell System In 1982–1983, AT&T Bell Laboratories, 1984, pp. 571–585.
Charles Schwab, "Guide to Using TeleBroker" brochure, pp. 1–21, Nov. 1994.
Charles Schwab, "Schwab TeleBroker Service" brochure, pp. 1–14, Oct. 1993.

*Primary Examiner*—Krista Zele
*Assistant Examiner*—Scott Wolinsky
*Attorney, Agent, or Firm*—Robert B. Levy

[57] ABSTRACT

A method of provisioning telecommunications service. A caller requesting service is connected to a switching system having prompting capabilities. The caller is prompted to enter a service type indicator selected from a brochure describing available service types. The service order request is automatically processed to determine whether the specified service is available to the caller and whether other data provided by the caller is consistent. Advantageously, a service order can be generated without requiring human intervention beyond the initial entry of data by the service requester. Advantageously, service request data can immediately be verified and data inconsistencies or incomplete data identified and requested of the caller immediately. Advantageously, errors in the process and the delay resulting from such errors are minimized.

5 Claims, 7 Drawing Sheets

TELECOMMUNICATIONS SERVICE PROVISIONING

This application is a continuation of application Ser. No. 08/627,326, filed on Apr. 4, 1996 now abandoned, which is a continuation of application Ser. No. 08/364,650, filed on Dec. 27, 1994 now abandoned.

TECHNICAL FIELD

This invention relates to arrangements for provisioning service for a telecommunications customer.

Problem

FIG. 1 is a block diagram illustrating the operation of a typical semi-automatic arrangement for provisioning telecommunication service to a customer. The systems shown in FIG. 1 are available from AT&T Network Systems. The blocks with rounded corners represent centers where human interface is required to move, obtain, or transform information. The rectangular blocks represent automated operation systems. In both cases standard generic names are used to convey the main work accomplished by the area.

Block 1 represents the process whereby a customer discusses telecommunications service with a business representative. As a result of the discussion the business representative fills out a paper form which is passed on to a service order clerk 2 who enters the data in that paper form into a system for use by a service order retrieval distribution center (SORD) 3. In the SORD, checks are made automatically for inconsistencies in the data provided on the service order and these errors may then lead to renegotiation with the original customer, or different assignment of telephone company facilities. In the service order retrieval distribution center, items which require equipment to be ordered either from the warehouse or from a vendor are recognized and an order is transmitted to an equipment order bureau 4 for obtaining the equipment. The SORD acts as the service order data distribution center. Other data in the service order is passed on to the loop maintenance operation system (LMOS) 5 and a service order analysis control (SOAC) bureau 6. The LMOS is connected to a maintenance center (MC) 15, where the installers, central office frame, and maintenance personnel receive information about the service order and perform functions necessary to physically implement service. Errors are sent to the MC for human intervention/resolution.

The service order analysis control (SOAC) bureau 6 communicates with a loop facility assignment control system (LFACS) 7 to assign loop facilities (cable pairs) and a work order number to the customer. SOAC reads the service order and generates assignment requests to the Computer System for Main Frame Operations (COSMOS) 8 and LFACS. SOAC control also communicates with a computer system operations center 8 which generates data for transmission to the network administration center 9 and the main distribution frame control center 10. SOAC communicates with COSMOS to obtain the central office assignment for the service order. The assignment is based on customer class of service, load balance, and capacity. The output is the office equipment number and the work order number. COSMOS also supplies the directory number. Errors are sent to a Network Administration Center (NAC) 9, Frame Control Center (FCC) 10, or Loop Assignment Center (LAC) 11 for human intervention/resolution.

Errors can be detected in analyzing the service order at the loop assignment center, frame control center and the network administration center and any of these errors will eventually require correction hopefully without reinvolvement of the customer. Those errors which may require reinvolvement with a customer should be caught in the original analysis by the service order retrieval distribution bureau. SORD 3 also sends data to the recent change operation system (RCOS) 12 for making changes in the data base of local switch 13. The changes generated by the recent change operation system are analyzed by the recent change memory administration center (RCMAC) 14 to make sure they are valid.

As can be seen from this brief description, a problem of the prior art is that the process is complex and there are many opportunities for error requiring extensive rewording of the service order. It is also slow because of the many manual interventions that are required. Manual intervention by the loop assignment center 11, frame control center 10 and maintenance center 15 is required unless previously dedicated outside plant and office equipment are used. This method of operation also leads to a long delay from the time a customer requests service until the service is actually provided.

Solution

In accordance with the principles of applicants' invention this problem is significantly alleviated and a contribution is made to the art in accordance with a system described, for example, in FIG. 2. FIG. 2 is different from FIG. 1 in that the customer directly provides all information, importantly including a service reference number, to the automatic processing arrangement of the provisioning system. FIG. 2 contains all the blocks of FIG. 1 except for the block representing the service negotiation and the data entry performed by the service order clerk. The operation systems are only used to complete the service order. In the unlikely event a problem is found, the system will default to include error procedures. Instead of the service negotiation and data entry by the service order clerk, the caller (service requester 17) directly enters data into the system via a telephone connection for example to the local switch 13 which switch then provides data via data base control 118 and data base system 120 to the service order retrieval and distribution system. Data is delivered directly to SORD 3 which distributes the service order (and keeps status) to LMOS 5, SOAC 6, and equipment order 4. When the service order is verified SORD 3 sends the service order to RCOS 12 for transmittal to the switch 13.

Since many of the errors are introduced during the service negotiation phase (block 1, FIG. 1) the customer (service requester) is provided with a brochure for describing each service and providing a service reference number for each service available to customers in that region. Part of the data provided by the customer to the service order retrieval distribution bureau 3 via local switch 13 is the service reference number that describes the service.

More generally in accordance with applicants' invention, a customer directly provides data to a service provisioning complex of service bureaus. The data includes a reference number that specifies the type of service requested by the customer. In accordance with one specific embodiment of the invention, the reference number, may specify not only features but type of equipment and type of protocol to be used in interfacing the equipment with the local switch to which the customer is to be connected. Based on this number, the availability and consistency of options specified by the customer can be verified.

The customer may communicate with the switch via a dual tone multifrequency (DTMF) telephone, via a more advanced telephone in which data can be directly specified and transmitted such as an integrated services digital network (ISDN) station and where necessary, via speech (for example, for addresses). Only if the customer is directly connected to the switch when placing the order, can a dial telephone be used. The speech recognition equipment may be used for detecting spelled words.

DETAILED DESCRIPTION

Figure 3:
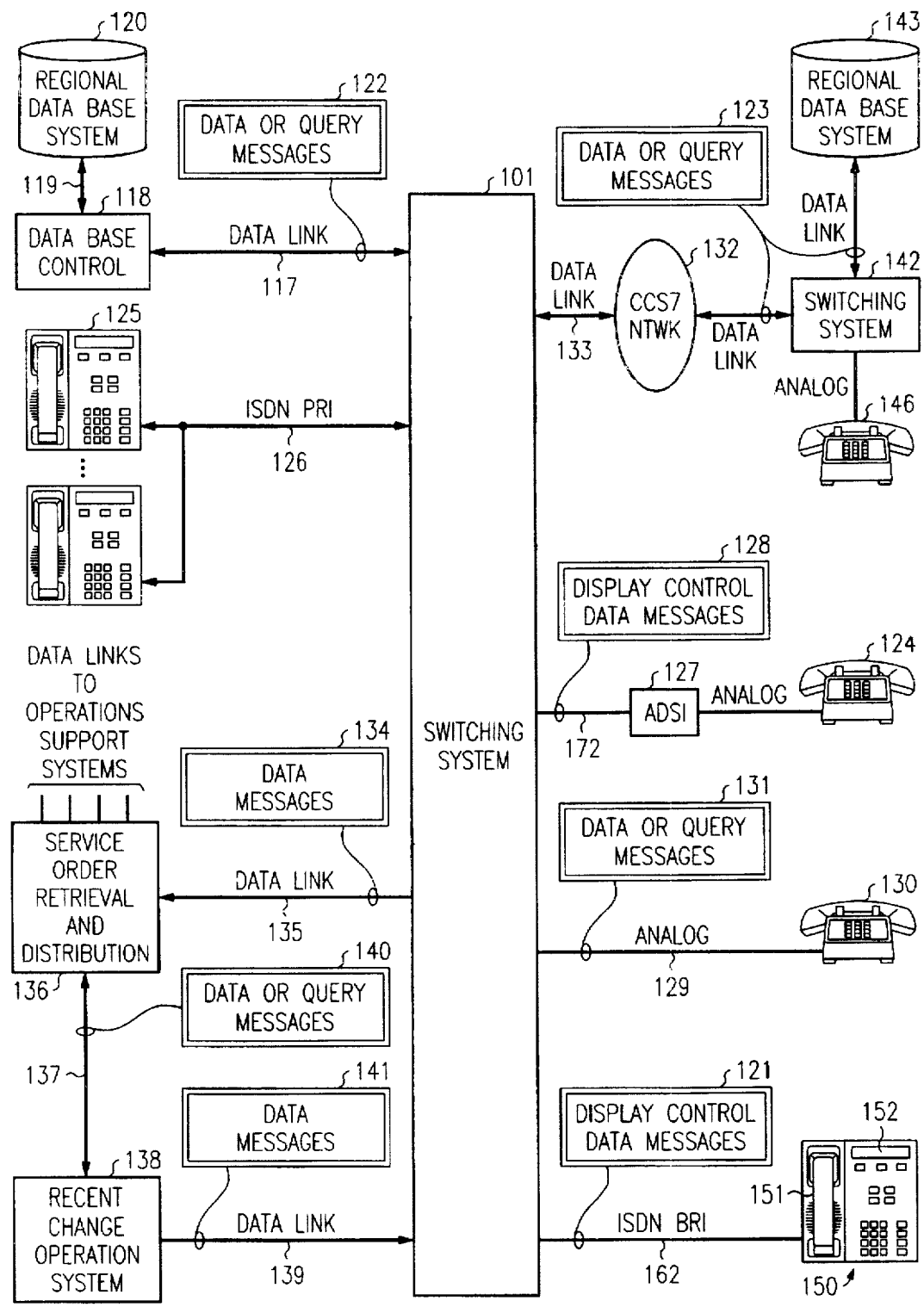
FIGS. 3 and 4 are a detailed block diagram illustrating the operation of the invention, with the details of the switching system shown in FIG. 4.
Figure 4:
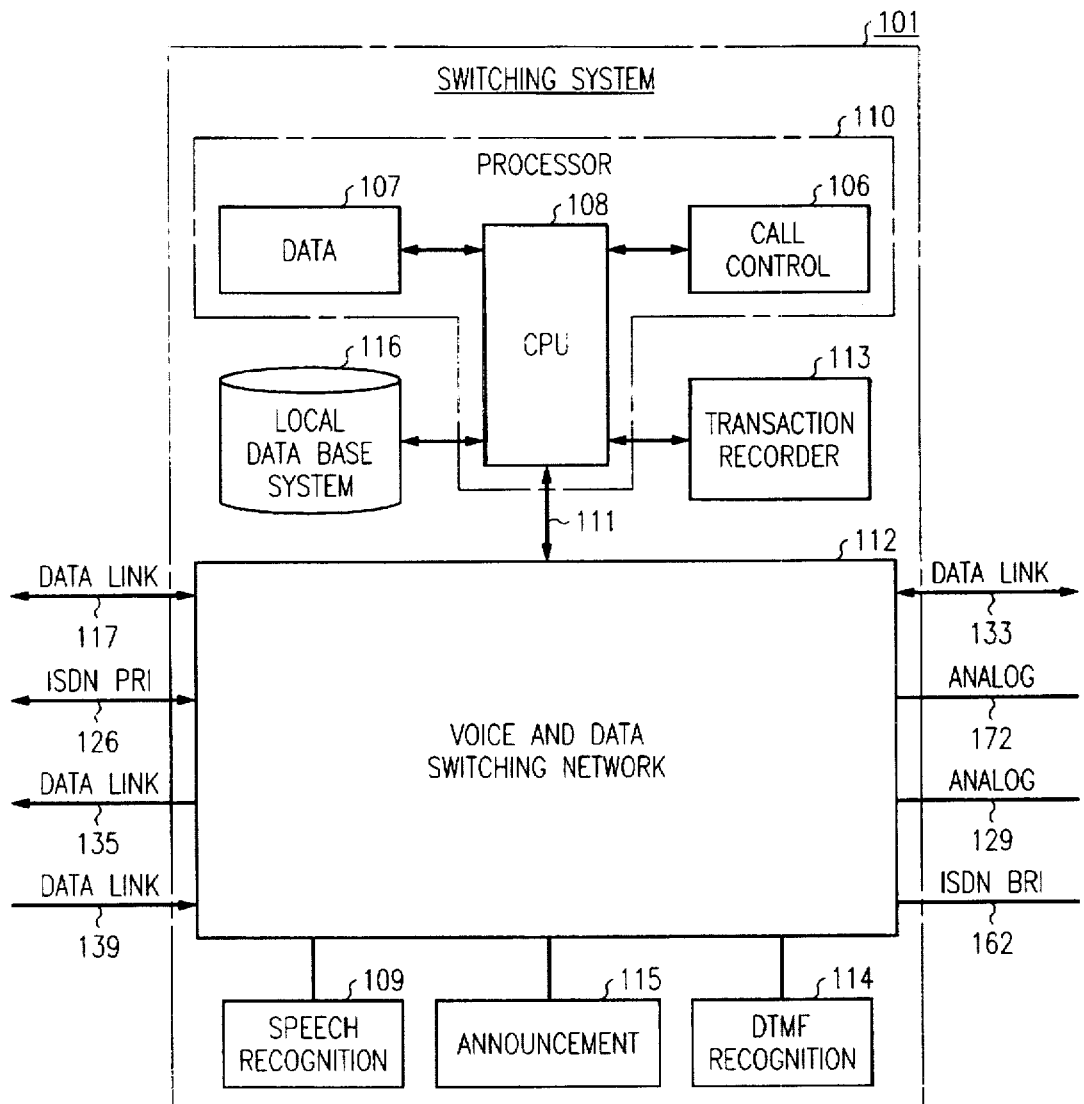

FIG. 3 is an architectural block diagram illustrating the operation of the invention with the details of the switching system shown in FIG. 4. The switching system (switch) 101 in this example is a 5ESS®-2000 described in *AT&T Technical Journal*, Vol. 73, No. 6, pages 28–39, November/December 1994, which switch is an advanced version of the 5ESS® Switch, extensively described in *AT&T Technical Journal*, Vol. 64, No. 6, part 2, pages 1305–1564, July/August 1985, manufactured by AT&T which has capabilities for switching both voice and data. This switch is adapted, for example, to handle integrated services digital network (ISDN) telephone stations such as telephone station 150. The ISDN telephone station set 150, comprises a handset 151 and display 152. This station set is equipped with an CCITT ISDN Basic Rate Interface (BRI), as described in CCITT Red Book Fascicle III.5 Series 1 Recommendation, and has the capability of handling standard Q.931 interface, as described in CCITT Red Book Fascicle VI.9 Recommendation Q.931. This switch is equipped to deal with station sets served via the basic rate interface (BRI) 162, or as telephone station 125 shows, those station sets served via the primary rate interface (PRI) 126.

The switching system also has the capabilities for dealing with ordinary analog telephones such as telephone station 130 via an analog line 129 or the telephone station 124 equipped, in this case, with an analog display services interface (ADSI) device 127 via an analog line 172. Further, the switching system can support a data link 117 to serve peripheral control devices like data base control 118 connected to a regional data base 120. Also, switching system 101 can support data link 135 to access Service Order Retrieval and Distribution system 136 and data link 139 to access Recent Change Operation System 138 to provide automated testing and implementing of service orders generated by customer requests. Further, switching system 101 can support data link 133 to access other switching systems via the CCS7 network 132 which interfaces switching system 142 serving station set 146 and regional data base 143.

The change required in the switching system to implement the present invention is the addition of a program in the processor 110 of the switch for executing the tasks described in the flow chart of FIG. 5. It is to be understood that depending on circumstances, the information being supplied to the calling customer may come from the local data base 116 or from a data base shared by a plurality of central office switching systems, like the data base control 118 and regional data base system 120. The switch 101 comprises a processor 110 for controlling the switch. The processor 110, in turn, comprises a central processing unit 108, call control 106 for controlling the operations of the central processing unit, and a data store 107 for storing call data. The switch also comprises a local data base system 116, storing data for: (1) customer lines connected to the system, such as the Q.931 equipped customer line 162, (2) interconnecting networks 132, (3) data links, such as data link 133 connected to the system, and (4) data about the data base control 118 connected to the system via data link 117. CPU 108 controls a transaction recorder 113 such as a magnetic tape unit which records usage information associated with services offered in accordance with applicant's invention. CPU 108 can also access a local data base system 116 for supplying data for display or audio prompt at telephone stations connected to switching system 101 or for supplying data or audio prompts in response to requests received from CCS7 network 132 over data link 133. The switch also comprises a voice and data switching network 112 which can be used for transmitting data among processor 110 and data base control 118, and for transmitting voice and data among data links coming into the system, such as data link 133 to CCS7 Network 132, and customer lines such as customer line 162. The CCS7 Network 132 which may include one or more switching systems is used for providing data or voice prompt to station 146 from switch 101.

Regional data base 120 is connected to the data base control 118 via data link 119. Voice and data switching network is 112 is connected to control unit 110 via a control connection 111. The data base control 118 and regional data base 120 are used for gathering provisioning information from the calling customer when requested by the local data base system 116 or externally initiated by the data base control 118 itself.

In this specific embodiment of the present invention, a customer requiring telephone service uses a brochure (Appendix I) to select the desired phone service code number. The corresponding data and equipment required to respond to the customer's request is shown in Table I, discussed hereinafter. The customer requests service by calling a special "free" number such as an 800 number. This call is initiated from the ISDN station set 150 by lifting the handset 151, which sends a Q.931 SETUP message over the BRI line 162 to the switching system 101. This service request is detected by the voice and data switching network 112 and relayed via control connection 111 to call control 106 in processor 110. Call control 106 then sends calling party identification and line status query message 122 to the data base control 118 via the data link 117. The data base control 118 queries the regional data base 120 over the data link 119 and finds the appropriate data message 122 which is sent to the voice and data switching network 112 via data link 117 for delivery to call control 106 via data link 111. Call control 106 places the data message in the Display Field of the appropriate Q.931 message sent to the calling party in response to the service request. The Q.931 protocol limits the maximum length of the Display Field information element to 44 octets.

FIG. 3 also illustrates a number of the types of data messages that are sent for implementing this invention. Data message 121 contains display control information for controlling a display on ISDN station set 150. Similar messages 128 are sent to the ADSI device 127 associated with the analog telephone station 124. Data messages 122 and 123 are query messages to request information from the data base system 120 in the case of data message 122 or from data base system 142 or terminating switching system 141 in the case of data message 123. These query data messages include the calling number and line status. The response is in data messages 121, 128, and 131 which include the response message.

The customer may wish to communicate his/her service request from a telephone that is not connected to switching system 101. In this specific embodiment switching system 101 has been designated as the system to communicate with the service order complex. In that case the customer at telephone 146 who is communicating with switching system 142 communicates through the common channel signaling 7 network 132 over data link 133 with switching system 101 in order to obtain the same kind of provisioning service available to customer at telephone 130 for example who is directly connected to switching system 101.

Data communications with an ISDN telephone are performed through the signaling channel which communicates via the voice and data switching network with CPU 108. Voice input for audio prompts to the customers is provided from announcement system 115. For customers placing their order from analog telephones such as telephone 130 requests are recognized in dual tone multifrequency (DTMF) receiver 114 and special non-numeric data is obtained from that customer using speech recognition unit 109. This unit might be used for example for obtaining an address probably by asking the customer to spell that address.

Figure 1:
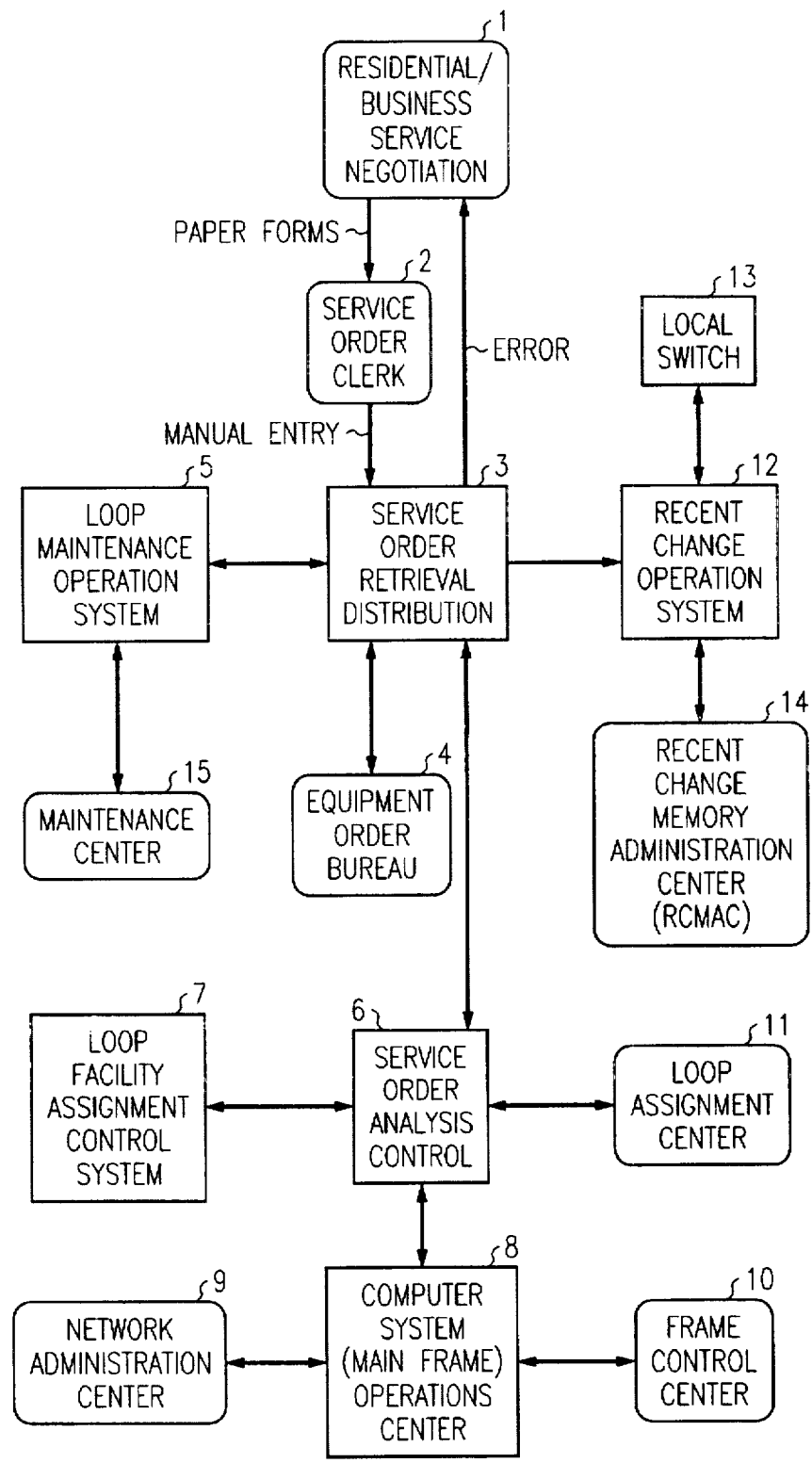
FIG. 1 is a block diagram of a prior art provisioning system for provisioning customer telecommunications service.
Figure 2:
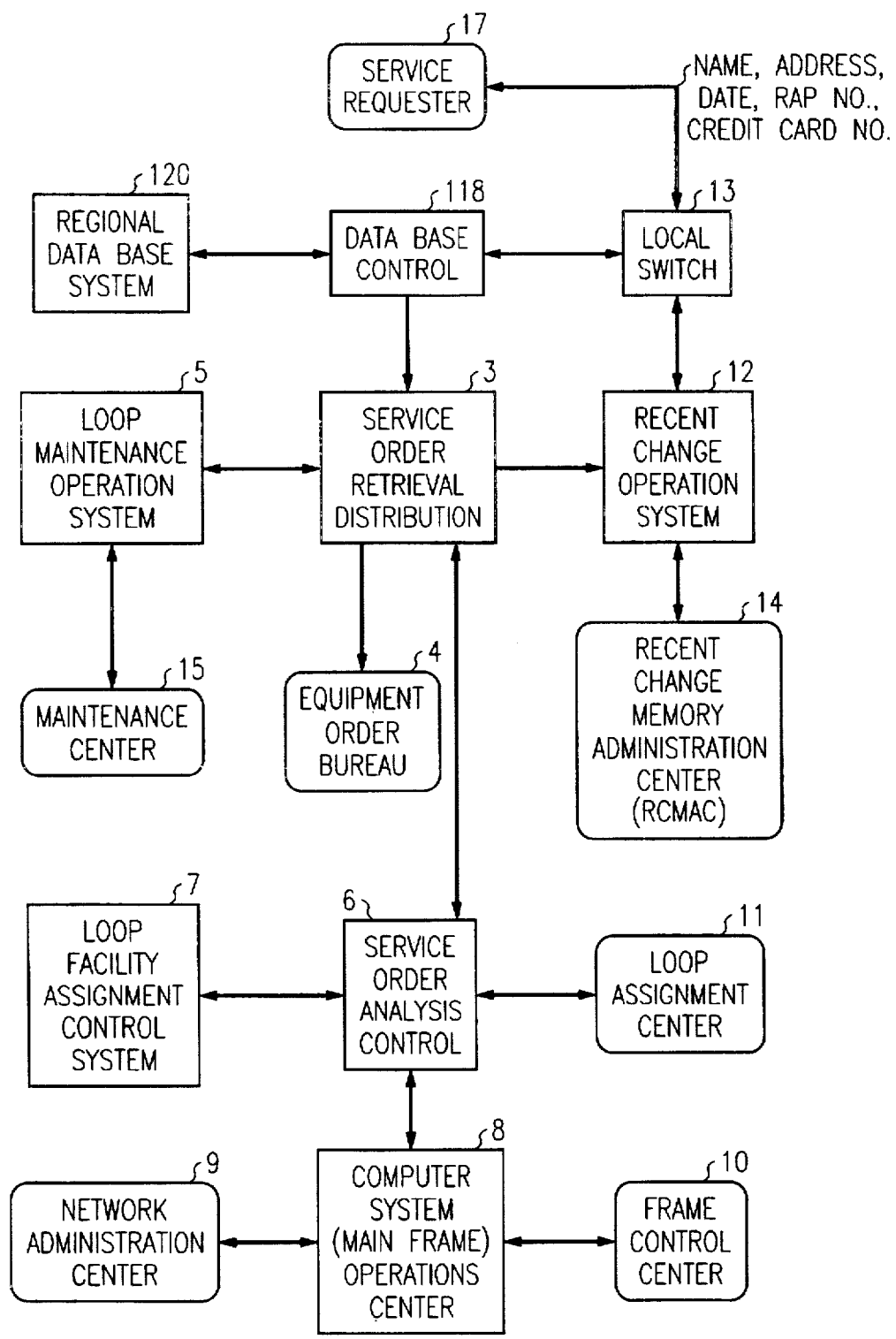
FIG. 2 is a block diagram for a provisioning system in accordance with applicants' invention.

The service order retrieval and distribution bureau is connected by data link 137 to the recent change operation system for entering recent changes into the local data base system 116 of switching system 110 and is connected by data links to the other operations support system shown in FIGS. 1 and 2 such as the loop maintenance operation system, service order analysis control and through the latter loop facility assignment control system, computer system, loop assignment center and through the computer system, the network administration center and the frame control center.

Figure 5A:
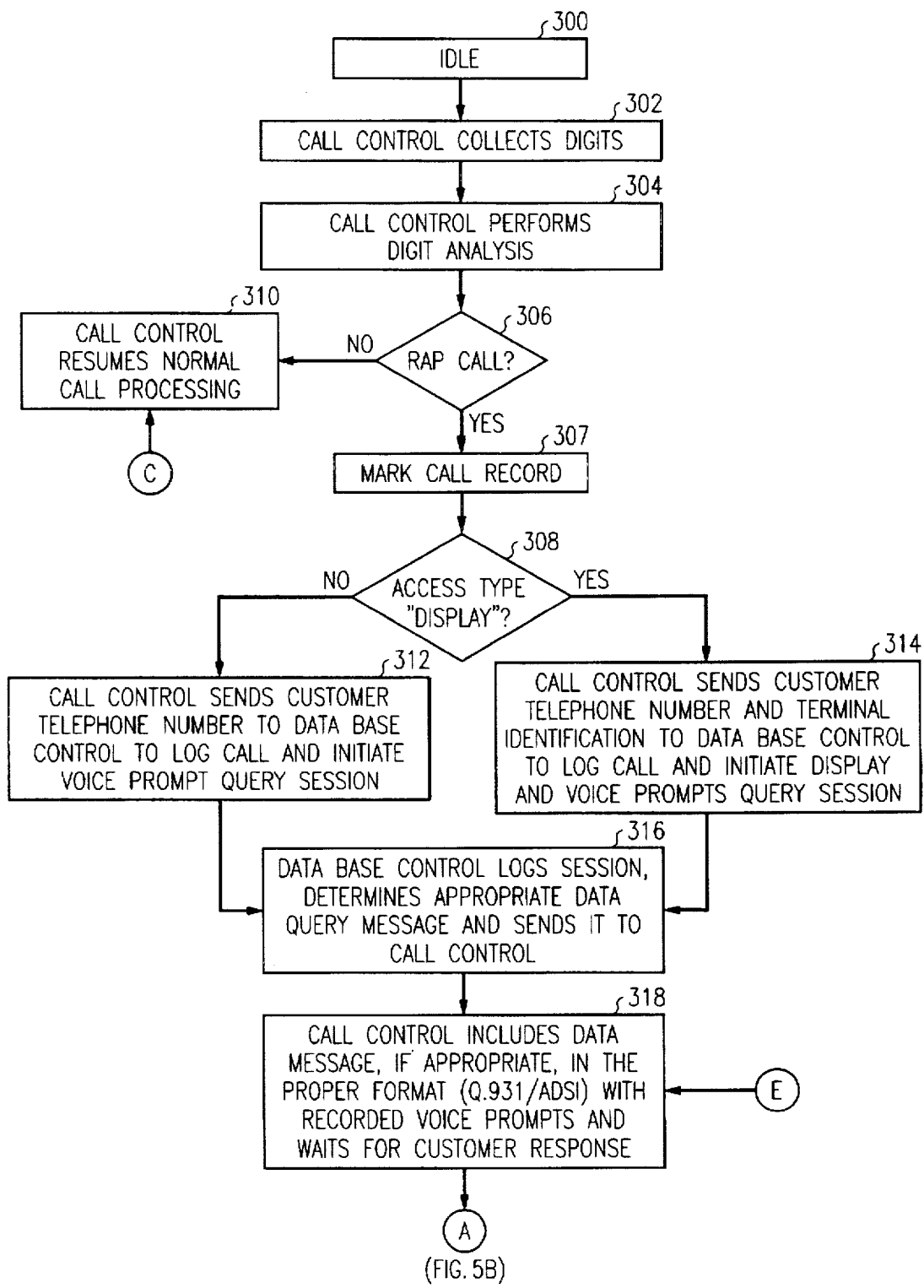
FIGS. 5A, 5B and 5C are a flow diagram illustrating the method of applicants' invention.
Figure 5B:
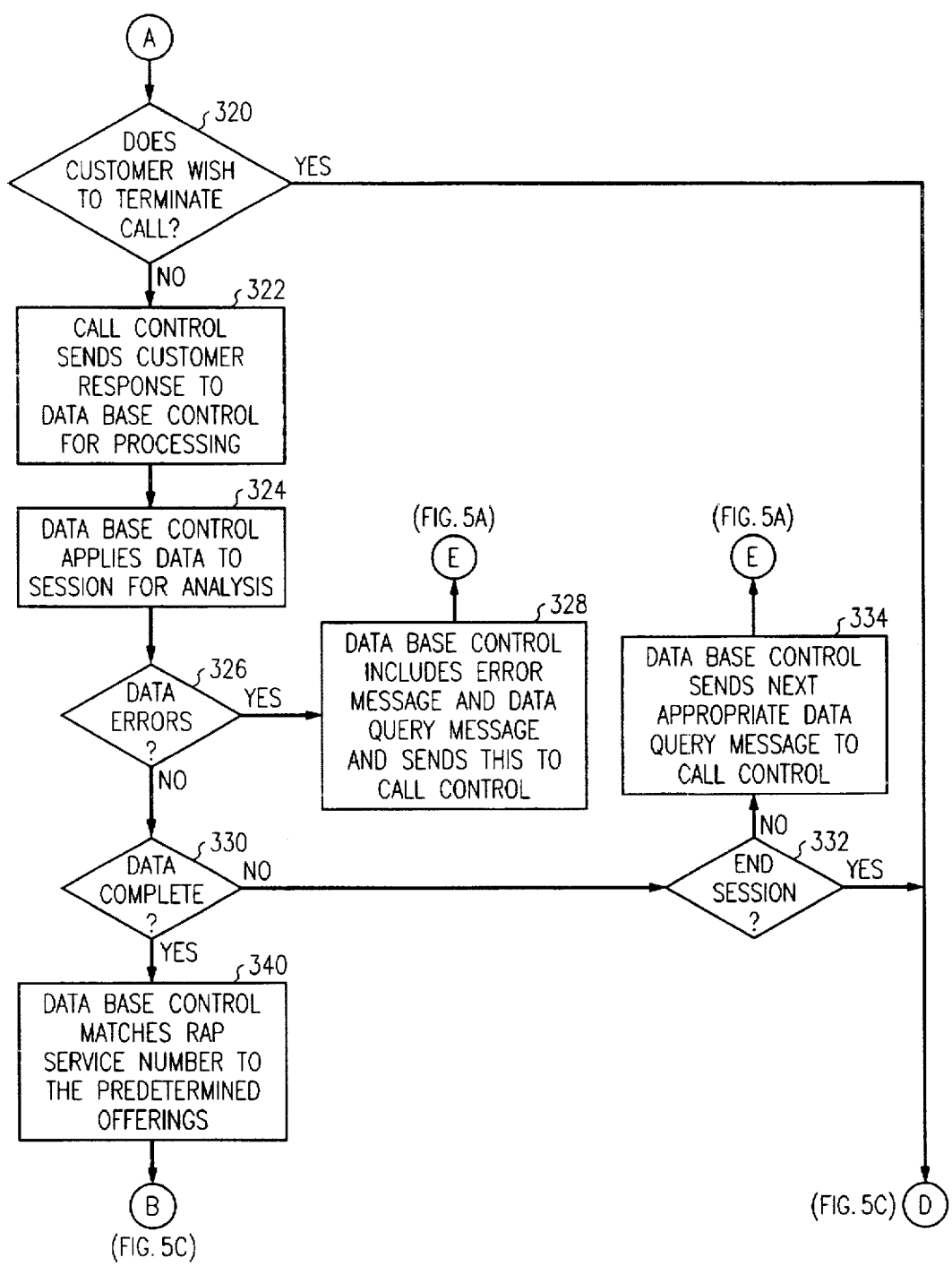
Figure 5C:
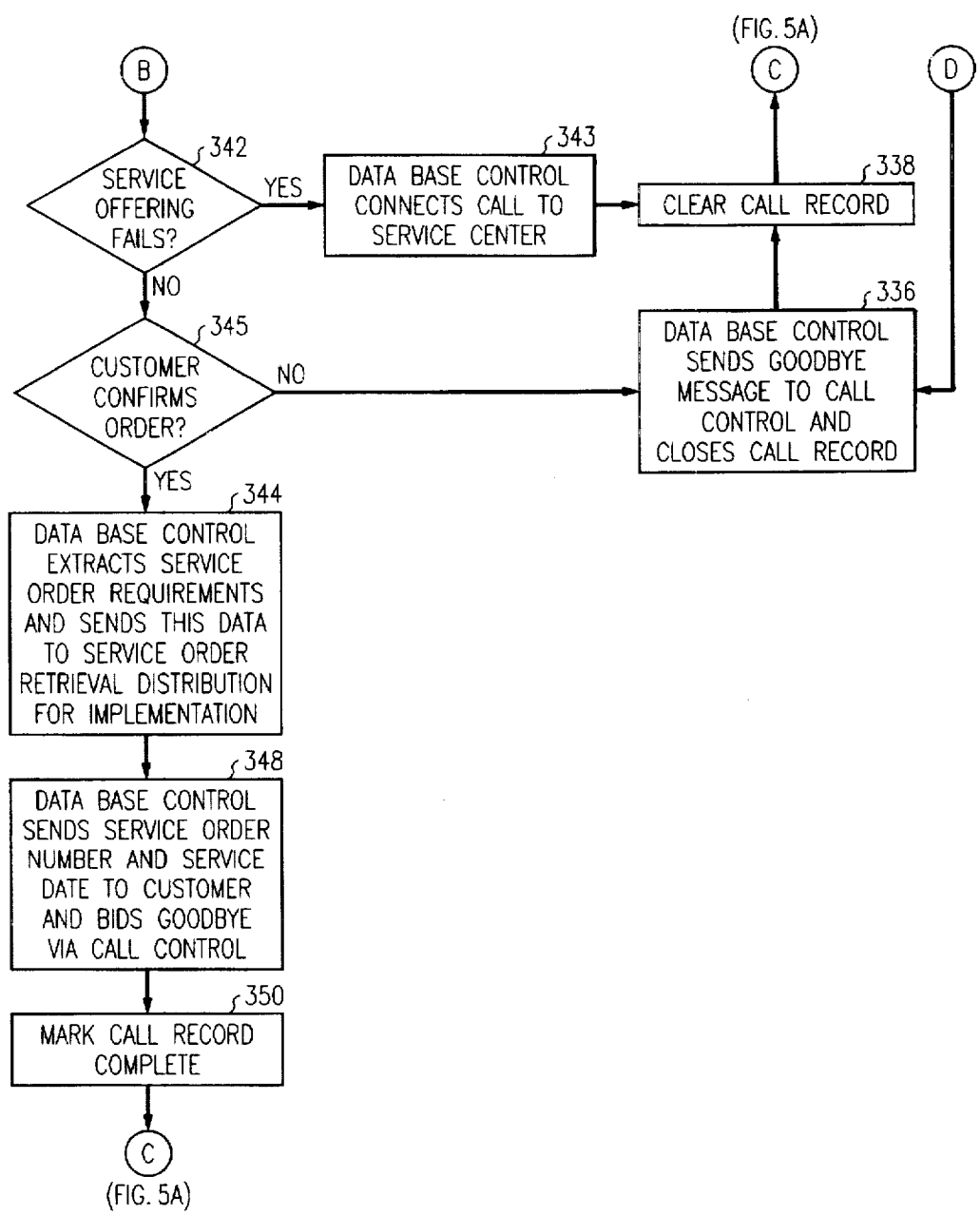

FIGS. 5A, 5B, and 5C are a flow diagram of the method of one embodiment of the present invention. These figures depict the operation of the customer information and called party identification service arrangement, comprising the calling party station set 150, the switching system 101 and the regional data base control 118. Calls that are treated in accordance with the principles of this invention are called Rapid Accurate Provisioning (RAP) calls. Other calls are given treatment by "normal call processing" signifying treatment in accordance with the normal practices for calls.

FIG. 5 illustrates the actions required to request the provisioning of service. Action block 300 indicates that a customer station from which the request is to be made is initially idle. The customer station goes off hook and call control collects digits for the customer (action block 302). If the customer's line is an ISDN line the process of collecting digits is one of receiving a data message from the caller. If the caller is using an analog telephone then the process of collecting digits is the conventional one of collecting digits one at a time from dial pulse or dual tone multifrequency (DTMF) signaling. The call control program of the switch then performs digit analysis (action block 304). Test 306 then determines whether this is a rapid accurate provisioning service call. If not, then call control performs normal call processing (action block 310). If this is a rapid accurate provisioning call, as determined by the number dialed by the customer, then the call record is duly marked to indicate the type of call (action block 307).

Note that the call may be an originating call, i.e., a call from a customer directly served by the switching system which is performing this analysis, or it may be an incoming call, i.e., a call from a station connected to another switching system wherein the call has been forwarded to a switching system that can serve RAP calls. In the latter case the customer continues to interact with the switch in essentially the same way that a directly connected customer interacts using DTMF or ISDN signaling (dial pulse signals are not carried between switching systems) and the serving switching system will use information obtained by automatic number identification for identifying the telephone station of the caller.

Test 308 then determines whether the caller has a display type telephone. If not then the call control sends the calling customer's telephone number to the data base control (adjunct processor 14) to log the call and initiate voice prompt query system (action block 312). If the customer does have a display then the call control sends the customer telephone number and an identifyer of the type of terminal of the caller to the data base control process to log the call and initiate a display and voice prompt query session (action block 314). In either case the data base control then logs a session for the RAP application and determines the appropriate data query messages to be transmitted to the caller and sends this information to the call control program (action block 316). The call control program then provides data messages if appropriate or prompts to the caller and waits for caller response (action block 318).

If the caller is calling from an ISDN telephone then the queries are sent in Q.931 messages; if the caller is calling from an ADSI (analog display telephone) telephone, the messages to the ADSI telephone are in frequency shift key (FSK) signals and are sent from that telephone by dual tone multifrequency (DTMF) tones. Call control then determines whether the customer wishes to terminate the session, i.e., cancel all requests (test 320). If so, action block 336, described hereinafter, is entered. If the customer does not wish to terminate the session, call control waits for a reply from the customer either in the form of a data message or in the form of DTMF digits or where appropriate in the form of speech detected data. When this has been received call control sends the customer response to the data base control for further processing (action block 322). Data base control then applies the data to the session record which is being established for this call for analysis (action block 324). The data is then analyzed to see if there are any errors (test 326). If so, then the data base control sends an error message response to the previously sent data query message (action block 328) and sends this to call control (action block 318) for a reprompt and re-enters action block 318. If no data errors have been found in test 326 then test 330 is used to determine whether the data is now complete and if not, test 332 is used to find out if the customer wants to end the session. If the customer wants to end the session (test 332) then data base control sends a goodbye message to call control (action block 336) and clears the call record (action block 338) then call control resumes normal call processing (action block 310). If the customer wants to continue (test 332) then data base control sends the next appropriate data query message (action block 334) to call control for data in the appropriate format to send to the customer (action block 318).

If the data is complete (test 330) then data base control matches the RAP service number to predetermined offerings (action block 340) and if the service offering fails (test 342) data base control connects the customer to the service center (action block 343), clears the call (action block 338), and returns to normal call processing (action block 310). If the service offering (action block 340) does not fail (test 342) test 345 determines whether the customer confirms the order. If so, then data base control sends service data to SORD for implementation (action block 344) and provides the customer with a service order number and bids goodbye (action block 348), marks the call record (action block 350), and returns to normal call processing (action block 310). If the customer does not confirm the order, action block 336, previously described, and its subsequent action blocks, are executed.

To illustrate the use of the rapid accurate provisioning service applicants have provided excerpts from a typical customer service guide in Appendix 1 and the corresponding data and services are shown in Table I. The customer service guide is designed to give the customer the information needed to allow the customer to enter service provisioning requests. The introduction provides the customer with the number to call (for example, 1-800-RAP-SERV) and tells the customer what information the customer should be ready to provide. Then for each basic type of service the customer service guide gives a rapid service number used for identifying a basic type of service and the tariff for such service.

GLOSSARY

CF—Call Forwarding
CPE—Customer Premises Equipment
CW—Call Waiting
DN—Directory Number
DSL—Digital Subscriber Line
ILEN—Integrated Line Equipment Number of subscriber in switch
ISCN—Integrated Service Circuit Number of subscriber in switch
ISLU—Integrated Service Line Unit of subscriber in switch
LCC—Line Class Code of customer
LCEN—Line Card Equipment Number of subscriber in switch
LEN—Line Equipment Number of subscriber in switch
MW—Multiway calling
PH—Packet Handler for ISDN line
PIC—Preferred Interexchange Carrier
SLE—Subscriber Loop Equipment for connection between subscriber and switch
SPID—Single Point Identifier (for voice and circuit switched data)

TABLE 1

SERVICE PROVIDER EXPANSION TO PROVISIONING

| RAPID SERVICE NUMBER | SERVICE NAME | EXPANDED OFFICE DATA & SERVICE PROVISIONING PARAMETERS | |
|---|---|---|---|
| R10001 | Analog - Basic | DN<br>LEN<br>+LCC<br>*PIC<br>*DP/TT<br>*CPE<br>*Privacy | |
| R10002 | Analog - Upgrade | DN<br>LEN<br>+LCC<br>*PIC<br>*DP/TT<br>*CPE<br>*Privacy<br>*MW<br>*CF | |
| B90001 | ISDN<br>Basic Voice,<br>Circuit Switched<br>Data, Packet<br>Data | DN<br>LCEN<br>ILEN<br>+LCC<br>PH<br>*PIC<br>*Privacy<br>Circuit Switched Data<br>SPID<br>Packet Switched Data:<br><br>+Voice features<br>+Data features | <br><br><br><br><br><br><br><br><br><br>+No. of Logical Channels<br>+Packet Throughput<br>+Packet Window - Send/Receive<br>+Packet Size - Send/Receive |

*= RAP caller provided added information
+= Implied by RAP number

The examples provided in Appendix 1 are for basic residential service; for a more advanced form of this residential service which includes call waiting; and for basic integrated services digital network (ISDN) voice, packet data, and circuit switched data service.

Table 1 indicates for each service the name of the service and the data which must be entered into the office data base in order to provide the service to the customer and the data which must be provided to the various service order bureaus in order to order the appropriate equipment and make sure that the appropriate connections are set up for the customer. Data without a footnote mark is basic data which must be supplied if the service of the RAP service order numbers is to be provided. Data with an asterisk is directly implied by the RAP service number. Data with a + sign is provided by the service requester.

For the case of basic analog service these parameters include the following:

1. Directory number: supplied by COSMOS unless there is an arrangement verified through prompts from the RAP system whereby a customer can retain a previous directory number, for example, for an upgrade of service or for a change from service provided by an alternate local exchange carrier.

2. The line equipment number (LEN) is provided by the COSMOS system.

3. The line class code is generated from the RAP service number plus other information provided by the customer in response to prompts.

4. The preferred interexchange carrier is supplied by the customer in response to prompts as indicated by the asterisk.

5. The choice of dial pulse or touch tone service is similarly provided by the customer in response to prompts.

6. Additional customer premises equipment (for example a call answering machine) is requested by the customer in response to prompts.

7. Privacy service wherein the customer's telephone number is not provided to the called party on incoming calling line identification, is requested by the customer in response to prompts.

All of these features are also available for the more advanced analog service which automatically specifies call waiting (CW), and which optionally includes, in addition, multiway calling (MW) and call forwarding (CF), both of which are specifiable by the customer.

For basic voice, packet data, and circuit switched data ISDN service, whose RAP number is B90001, the directory number, line card equipment number, integrated line equipment number must be supplied by the service bureaus. The line class code is imp lied by the RAP number. The customer must provide the preferred interexchange carrier and an indication of whether the privacy is requested. The provisioning of circuit switched data is implied by the RAP number and the SPID for that customer is supplied by the service bureau. In addition, basic voice features and data features for that type of service are implied by the RAP number. For the packet switched data features the RAP number implies the number of logical channels required, the packet throughput, the packet window of the number of packets which may be sent without an acknowledgment and the packet size are all implied from the RAP service number.

Clearly more complex ISDN services may require more input from the caller and will have a larger number of fields supplied by the service bureau or implied by the RAP number.

In order to implement the options implied by the RAP number, the data describing circuit switched data, circuit switched line and packet switched data arrangements must be provided to the office data base.

While in this preferred embodiment one basic number is used to identify a basic type of service, and options within that service are provided by the caller in response to prompts from the RAP provider, an alternative arrangement allows a caller to provide specific digits in the RAP service number to indicate specific options. For example, the third digit could be used to indicate specific combinations of features, for example of call waiting, three way calling, and call forwarding. The preferred embodiment has the advantage that the full flexibility of a computer based prompting system can be used wherein the prompts are tailored to the specific basic service requested by the caller; this is particularly advantageous for an arrangement such as the RAP service in which the typical customer uses the service very infrequently.

Generally, simple options can readily be provided through options offered by an announcement, since customers are likely to understand these options. More complex options or option sets should be provided through a separate RAP service number since a customer could easily become confused and may wish to select conflicting options. Auxiliary RAP numbers can also be described in the RAP brochure and used for offering complex feature sets for a basic service specified by the basic RAP number.

Advantageously, manufacturers of customer premises equipment will be able to specify the RAP code to be used, and the answers to queries for that RAP code. It is desirable to retain the RAP number in one of the service bureau's data base in case a customer encounters trouble. The data base can then be queried and the RAP number compared with the customer's recollection (perhaps aided by the manufacturer's brochure) of the type of service requested. Alternatively and additionally, the RAP number recollected by the customer can be compared with the features implemented for that customer to ensure that the features implied by the RAP number match the service features actually provided to the customer. This guards against inadvertent changes of customer service or mistakes in manual operations to implement the service.

Features implemented through the data bases of an intelligent network can also be specified by the RAP number. For example, a "warm line" service wherein elderly or disabled customers can reach a destination of their choice when they go off-hook can be implemented via a routing data base in the intelligent network. Such service can be specified by a RAP number and will be implemented through both central office features and intelligent network features.

It is to be understood that the above-described procedures are merely illustrative of the principles of the present invention and many variations may be devised by those skilled in the art without departing from the scope of the invention. For example, instead of delivering the customer information and called party identification message for visual display, the process could alternatively relay the information as a voice message.

---

APPENDIX I - CUSTOMER SERVICE GUIDE

Introduction

Welcome to the newest and easiest way to order phone service. Rapid Accurate Provisioning (RAP) allows you to order phone service in the most informal and comfortable way. Please review the following service offerings and pick the one that best suits your needs. When you find the one right for you just call 1-800-RAP-SERV and have the following information handy.

-continued

APPENDIX I - CUSTOMER SERVICE GUIDE

Your name and billing information (Credit card number).
Address for service.
Date of service.
RAP Service Number.
Do you need additional Customer Premises Equipment (e.g., answering machine)?
Do you want rotary or touch-tone service?
Do you want privacy? (Don't allow others to obtain your phone number).
What Interexchange Long Distance) Carrier do you want?
Do you want data service? If so, be prepared to enter speed and protocol.
Remember that if you don't find the exact service you require you can simply call or visit our Service Bureau during our regular business hours.

| RAPID SERVICE NUMBER | SERVICE DESCRIPTION | | |
|---|---|---|---|
| R10001 | Select this for basic residential single line phone service. The monthly service charge is tariffed as follows: | | |
| | Local Service | | $ 9.88 |
| |    1 Rotary service | $ 0.00 | |
| |    1 touch-tone service | $ 0.73 | |
| |    1 line charge | $ 9.15 | |
| | Supplemental Line Charge/s | | $ 3.50 |
| | Monthly Service with Touch-Tone | | $13.38 |
| | (excludes Federal/State tax) | | |
| | Local Usage Service applies as follows | | |
| |    No discount 9am–8pm | | |
| |    40% discount 8pm–9am | | |
| |    No charge for first 175 minutes. | | |
| |    Thereafter a $0.05 per minute charge applies. | | |
| R10002 | Select this for residential single line phone service with call waiting. The monthly service charge is tariffed as follows: | | |
| | Local Service | | $ 9.88 |
| |    1 Rotary service | $ 0.00 | |
| |    1 touch-tone seryice | $ 0.73 | |
| |    1 line charge/s | $ 9.15 | |
| | 1 Call Waiting | | $ 2.50 |
| | Supplemental Line Charge/s | | $ 3.50 |
| | Monthly Service with Touch-tone | | $15.88 |
| | (excludes Federal/State tax) | | |
| | Local Usage Service applies as follows: | | |
| |    No discount 9am–8pm | | |
| |    40% discount 8pm–9am | | |
| |    No charge for first 175 minutes. | | |
| |    Thereafter a $0.05 per minute charge applies. | | |
| B90001 | Select this for our most popular small business "work-at-home" ISDN voice and data service. This service comes with two voice channels and a data channel to provide maximum flexibility on a single line. Multiple call appearances provide advanced call waiting and call handling capabilities. The service provides conferencing features, specifically including conference, transfer drop and hold. The monthly service charge is tariffed as follows: | | |
| | Local Service | | $30.30 |
| |    1 line charge/s (2 channels) | $18.30 | |
| |    1 multiple call appearance/s | $ 3.00 | |
| | 1 conferencing feature | $ 9.00 | |
| | Supplemental Line Charge/s | | $ 3.50 |
| | Monthly Service (excludes | | $33.80 |
| | Federal/State tax) | | |
| | Local Usage Service applies as follows: | | |
| |    No discount 9am–8pm | | |
| |    40% discount 8pm–9am | | |
| |    No charge for first 175 minutes. | | |
| |    Thereafter a $0.05 per minute charge applies. | | |
| | Packet Data service applies as follows: | | |
| |    0.25 per minute. | | |

The invention claimed is:

1. In a telecommunications system including a switching system serving a plurality of calling stations, a method of provisioning determined set of subscriber-desired telecommunications services, comprising the steps of:

providing, to at least one subscriber wishing to newly activate service for at least one calling station, human-intelligible documentary information descriptive of different sets of available subscriber-desired telecommunications services;

establishing a connection between said one calling station and said switching system, said connection being established by transmitting a telephone number dialed from said one calling station where said telephone number identifies and provides access to a means in said switching system for provisioning said different sets of services, said means accessible to all calling stations having access to said switching system;

transmitting prompts from said switching system to said one calling station to solicit a response from said one subscriber at said one calling station indicative of a desired set of services described in the documentary information provided to said one subscriber;

entering data at said one calling station in response to said prompts specifying said desired set of services to be provisioned, said data comprising an identifying indicator, obtained by the subscriber from the documentary information, specifying said desired set of services;

transmitting said data to a service order provisioning system;

processing said data for generating a service order; and automatically initiating steps to provide said desired set of services to said one calling station.

2. The method of claim 1 further comprising the steps of: reporting to said one calling station information regarding said desired set of services;

and responsive to an indication transmitted from said one calling station, automatically initiating steps to provide the desired set of services.

3. The method of claim 2 further comprising the step of: responsive to an indication transmitted from said one calling station, canceling a service order request.

4. The method of claim 1 wherein the step of establishing a connection comprises the step of:

dialing a prespecified 800 number for establishing said connection and for identifying said connection as a request for provisioning of service.

5. The method of claim 1 wherein the step of establishing a connection comprises the step of:

establishing a connection through at least one intermediate switching system.

\* \* \* \* \*

UNITED STATES PATENT AND TRADEMARK OFFICE
CERTIFICATE OF CORRECTION

PATENT NO  : 5,751,802
DATED      : May 12, 1998
INVENTOR(S): Richard Gregory Carr and Francis Joseph Pope, III It is certified that error appears in the above-identified patent and that said Letters Patent is hereby corrected as shown below:

Title page, item [73],

The correct name and address of the Assignee is:

AT&T Corp.

New York, NY

Signed and Sealed this

Fourth Day of April, 2000

Q. TODD DICKINSON

Attest:

Attesting Officer

Director of Patents and Trademarks